United States Patent
Yu

(10) Patent No.: US 10,128,671 B2
(45) Date of Patent: Nov. 13, 2018

(54) CUPHOLDER (3 IN 1)

(71) Applicant: Travelers Club Luggage, Inc., La Palma, CA (US)

(72) Inventor: Peter Dalsoo Yu, La Palma, CA (US)

(73) Assignee: Travelers Club Luggage, Inc., La Palma, CA (US)

( * ) Notice: Subject to any disclaimer, the term of this patent is extended or adjusted under 35 U.S.C. 154(b) by 0 days.

(21) Appl. No.: 15/439,557

(22) Filed: Feb. 22, 2017

(65) Prior Publication Data
US 2018/0152033 A1    May 31, 2018

(30) Foreign Application Priority Data

Nov. 29, 2016  (CN) .................... 2016 2 1291458 U

(51) Int. Cl.
| | |
|---|---|
| *B65D 25/00* | (2006.01) |
| *H02J 7/00* | (2006.01) |
| *H01R 24/62* | (2011.01) |
| *H01R 33/94* | (2006.01) |
| *A47G 23/02* | (2006.01) |
| *H01R 107/00* | (2006.01) |

(52) U.S. Cl.
CPC ........ *H02J 7/0044* (2013.01); *A47G 23/0216* (2013.01); *H01R 24/62* (2013.01); *H01R 33/94* (2013.01); *H02J 7/0052* (2013.01); *H01R 2107/00* (2013.01); *H02J 2007/0062* (2013.01)

(58) Field of Classification Search
CPC ................... H02J 7/0044; H02J 7/0052; H02J 2007/0062; A47G 23/0216; H01R 33/94; H01R 24/62; H01R 2107/00
USPC .......... 220/694, 737–743; 215/386, 387, 388
See application file for complete search history.

(56) References Cited

U.S. PATENT DOCUMENTS

| | | | |
|---|---|---|---|
| 7,597,300 B2 * | 10/2009 | Harada | A47G 23/0225 220/282 |
| 9,109,746 B1 * | 8/2015 | Boyd | F16M 11/04 |
| 2008/0019082 A1 * | 1/2008 | Krieger | B60R 11/0241 361/601 |
| 2017/0175959 A1 * | 6/2017 | Maglica | F21L 4/085 |

* cited by examiner

*Primary Examiner* — Kareen Thomas

(57) ABSTRACT

The present invention discloses a charging cup holder with slot having a cup sleeve, a fixing base and a cup carrier, the cup sleeve used for a cup passing through is hinged to the upper end of the fixing base, and the cup carrier for supporting the cup is hinged to the lower end of the fixing base, wherein a USB interface used to electrically connect with a mobile terminal is provided on the fixing base and the cup sleeve is provided with two opposite slots for placing the mobile terminal. The charging cup holder may not only hold the cup, but also the mobile terminals can be placed in the slot of the cup sleeve conveniently, such as cell phones and other mobile electronic devices, to realize charging easily by electrically connecting to the USB interface on the fixing base.

10 Claims, 7 Drawing Sheets

CUPHOLDER (3 IN 1)

BACKGROUND OF THE INVENTION

Cup holders are used for placing the cup, bringing convenience to people's lives because they are available to be carried around. In addition, with the popularity of intelligent devices, the problem of mobile terminal charging has become widespread. The single function of the existing cup holders cannot satisfy the various demands of people. Accordingly, it will bring further convenience for people's lives to provide a cup holder with two functions of both placing cup and charging a mobile terminal.

BRIEF SUMMARY OF THE INVENTION

The technical problem to be solved by the present invention is to overcome the defects of the single function of the current cup holder by providing a charging cup holder with a slot.

The present invention solves the above technical problem by providing the following technical solutions:

A charging cup holder with a slot, which comprises a cup sleeve, a fixing base and a cup carrier; the cup sleeve used for a cup passing through is hinged to an upper end of the fixing base, and the cup carrier for supporting the cup is hinged to a lower end of the fixing base, wherein a USB interface used to be electrically connected to a mobile terminal, such as cell phones and other similar mobile electronic devices, is provided on the fixing base and the cup sleeve is provided with two opposite slots for placing the mobile terminal.

Preferably, the cup sleeve has an upper shell and an upper side shell fixedly connected to a rim of the upper shell, and the slot intersects with both the upper shell and the upper side shell, and each slot has a first concave surface and a second concave surface, which are formed by intersecting with the upper shell, and each slot further has a third concave surface, a forth surface and a fifth surface, which are formed by intersecting with the upper side shell, and the first concave surface is opposite to the second concave surface, and the third concave surface is opposite to the forth concave surface, and both ends of the third concave surface are respectively connected to the first concave surface and the fifth concave surface, and both ends of the forth concave surface are respectively connected to the third concave surface and the forth concave surface.

Preferably, the first concave surface and the second concave surface of each slot are mutually parallel, and the third concave surface and the forth concave surface of each slot are mutually parallel.

Preferably, the upper shell is provided with a circular through hole used for the cup passing through, and the circular through hole is formed around an axis, and the first concave surface and the second concave surface has a symmetrical face which intersects with the axis.

Preferably, the upper shell has an upper shell face, and the first concave surface of each slot intersects with the upper shell face at a first top edge, and the second concave surface intersects with the upper shell at the second top edge, and the distance between the first top edge and the second top edge is preferably about 12 mm-18 mm.

Preferably, an angle between the upper shell face and the third concave surface and an angle between the upper shell face and the forth concave surface that is parallel to the third concave surface are about 30-50 degree, respectively.

Preferably, the fifth concave surface is parallel to the upper shell face, and distance between the fifth concave surface and the upper shell surface is equal to or longer than about 12 mm, and the minimum height of the upper side shell at the fifth concave surface is equal to or higher than about 4 mm.

Preferably, the third concave surface is further away from the hinge of the cup sleeve and the fixing base than the forth concave surface, and the third concave surface is gradually far away the fixing base from one end close to the first concave surface to another end close to the fifth concave surface.

Preferably, the cup carrier has a lower shell and a lower side shell fixedly connected to a rim of the lower shell, and the cup carrier is provided with two opposite depressed portions located on the lower side shell, and there are two transmission links provided between the cup carrier and the cup sleeve, and both of the cup sleeve and cup carrier can rotate 0-90 degree relative to the fixing base, and the two transmission links will be located in the two depressed portions, when the rotation angle of the cup carrier relative to the fixing base is 0 degree.

Preferably, the cup sleeve and the cup carrier can rotate around the fixing base so that the mobile terminal is simultaneously placed in the two depressed portions and in two slots.

The above-mentioned preferred conditions may be arbitrarily combined to obtain the preferred embodiments of the present invention, in accordance with the common knowledge in the art.

The positive progress effect of the present invention is as follows:

The charging cup holder with slot may not only place the cup, but also mobile terminals can be placed in the slot of the cup sleeve conveniently, such as phones, to realize charging easily by electrically connecting to the USB interface on the fixing base. It can bring a greater convenience to people's living because of its multiple functions.

BRIEF DESCRIPTION OF THE SEVERAL VIEWS OF THE DRAWING(S)

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DESCRIPTION OF REFERENCE NUMERALS

Figure 1:
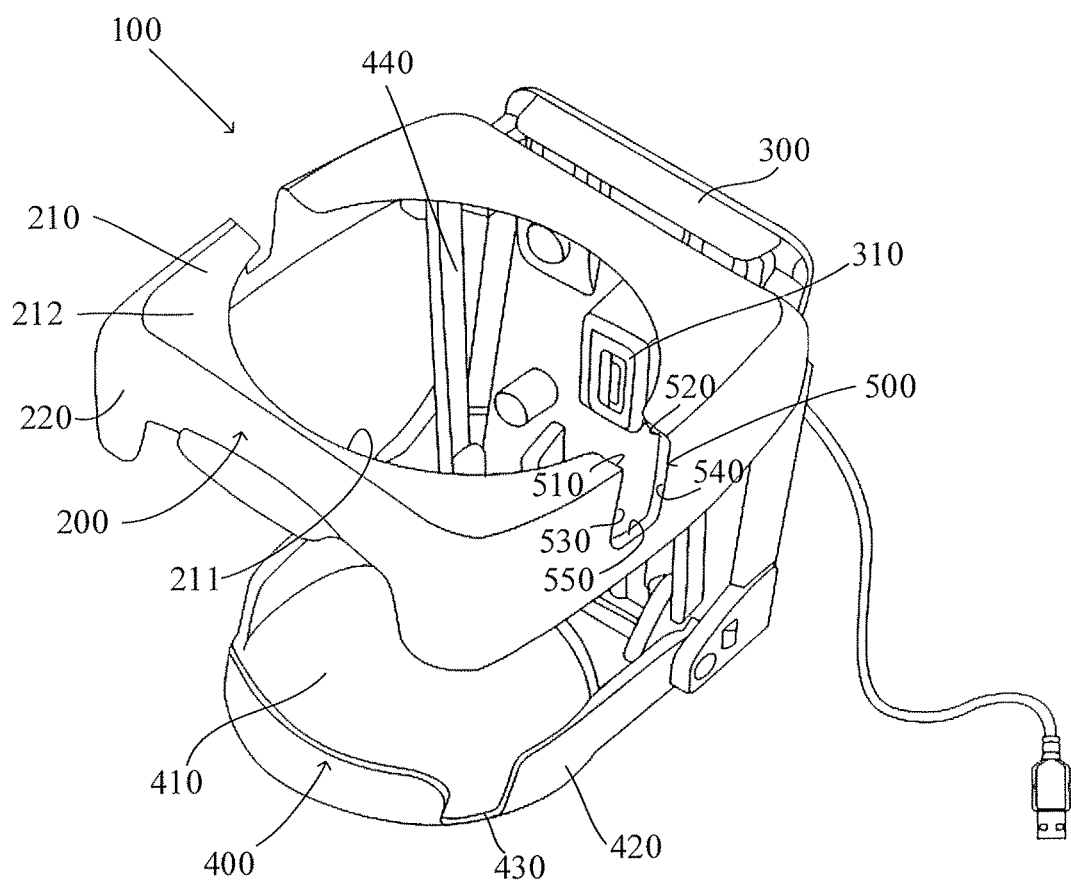
FIG. 1 is a perspective structural view of the charging cup holder with slot.

100: charging cup holder with slot
200: cup sleeve
210: upper shell
211: circular through hole
212: upper shell face
220: upper side shell
300: fixing base
310: USB interface
400: cup carrier
410: lower shell
420: lower side shell
430: depressed portion
440: transmission links
500: slot
510: first concave surface
511: first top edge
520: second concave surface
521: second top edge
530: third concave surface
540: forth concave surface
550: fifth concave surface
800: cup
900: mobile terminal

DETAILED DESCRIPTION OF THE INVENTION

The preferable embodiment will be described combined with figures to illustrate the present invention more precisely and completely.

Figure 2:
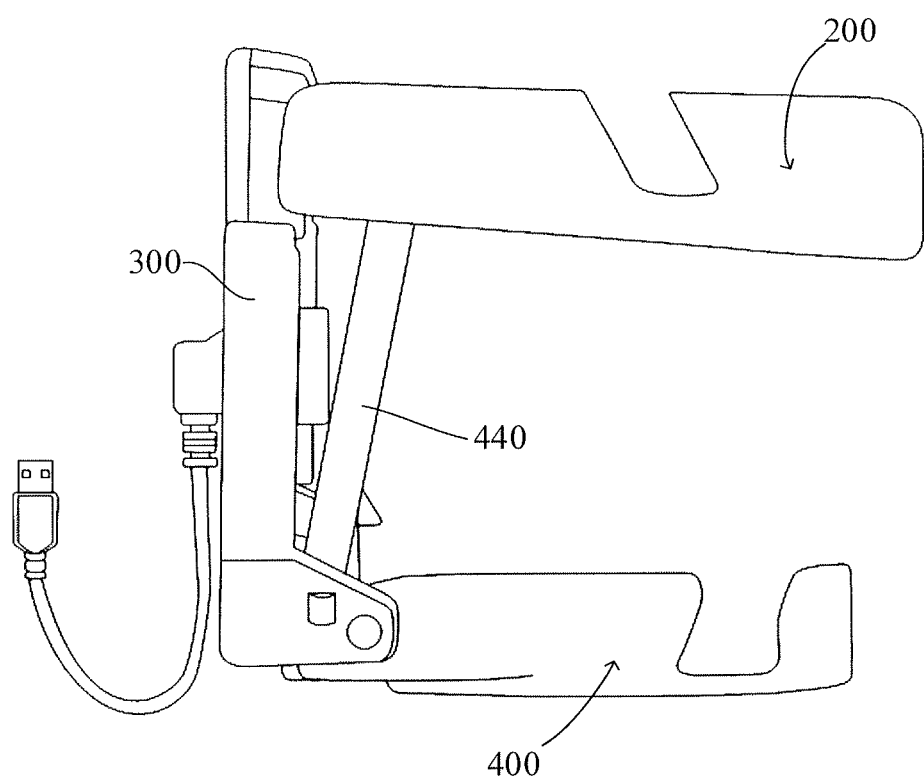
FIG. 2 is a left view of the cup holder according to the preferable embodiment.
Figure 3:
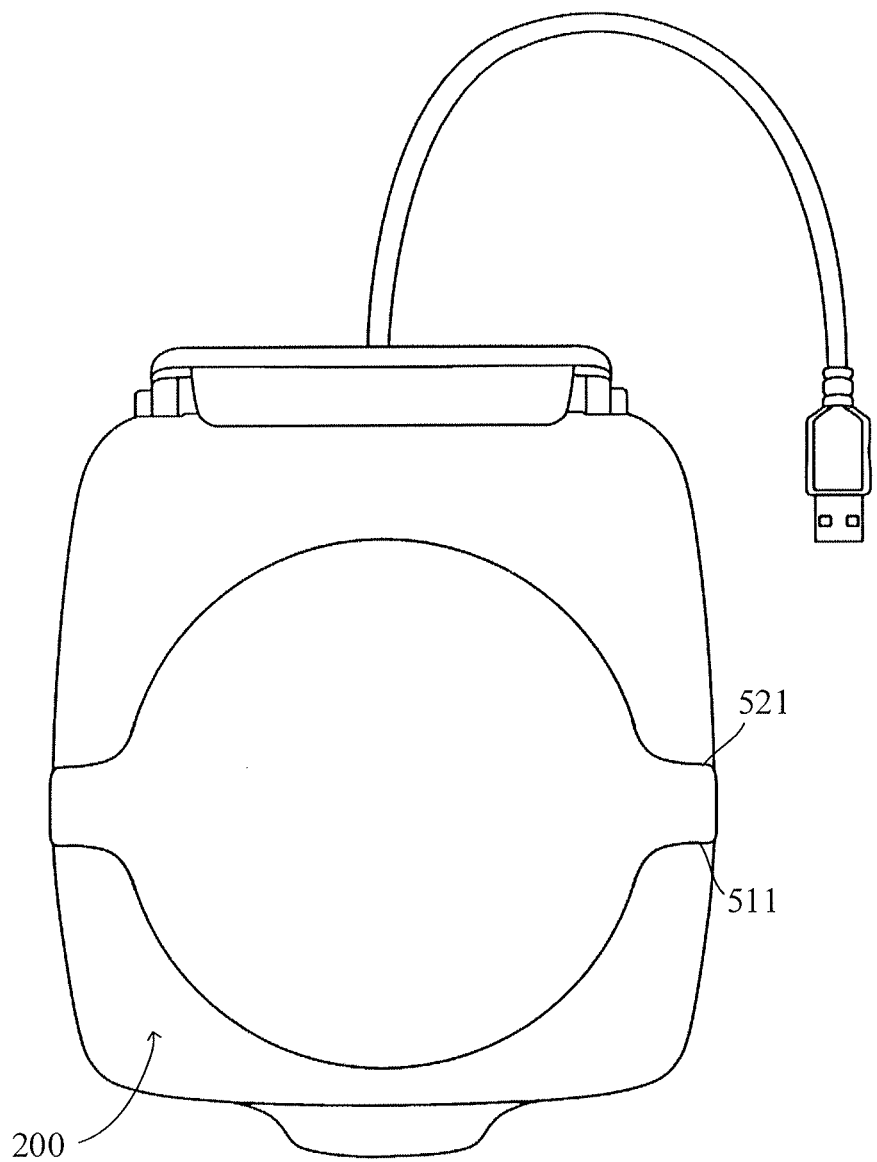
FIG. 3 is a top view of the cup holder according to the preferable embodiment.

As shown in FIGS. 1-3, a charging cup holder with slot 100 is provided with a cup sleeve 200, a fixing base 300 and a cup carrier 400. The cup sleeve 200 is hinged to the upper end of the fixing base 300. The cup carrier 400 for supporting the cup 800 is hinged to the lower end of the fixing base 300 and the cup 800 can pass through the cup sleeve 200. There are two transmission links 440 provided between the cup carrier 400 and the cup sleeve 200, and both of the cup sleeve 200 and cup carrier 400 can rotate 0~90 degree relative to the fixing base 300.

A USB interface 310, which can be used to electrically connect with mobile terminal 900, is provided on the fixing base 300, and the cup sleeve 200 is provided with two opposite slots 500 used for placing the mobile terminal 900.

The cup sleeve 200 has an upper shell 210 and an upper side shell 220, wherein the upper side shell 220 fixedly connects to the rim of the upper shell 210. The slot 500 intersects with both the upper shell 210 and the upper side shell 220 and each slot 500 has a first concave surface 510 and a second concave surface 520, which are formed by intersecting with the upper shell 210. Each slot 500 further has a third concave surface 530, a forth concave surface 540 and a fifth concave surface 550, which are formed by intersecting with the upper side shell 220. The first concave surface 510 is opposite to the second concave surface 210, and the third concave surface 530 is opposite to the forth concave surface 540, and both ends of the third concave surface 530 are respectively connected to the first concave surface 510 and the fifth concave surface 550, and both ends of the forth concave surface 540 are respectively connected to the second concave surface 520 and the fifth concave surface 550, and both ends of the fifth concave surface 550 are respectively connected to the third concave surface 530 and the forth concave surface 540.

In the embodiment, the first concave surface 510 and the second concave surface 520 of each slot 500 are mutually parallel. The third concave surface 530 and the forth concave surface 540 of each slot 500 are mutually parallel. The upper shell 210 is provided with a circular through hole 211, through which the cup 800 can pass. The circular through hole 211 is formed around an axis, and the first concave surface 510 and the second concave surface 520 has a symmetrical face which intersects with the axis.

The first concave surface 510 and the second concave 520 are connected to the inner surface of the circular through holes 211 through cambered surface.

The upper shell 210 has an upper shell face 212, the first concave surface 510 of each slot 500 intersects with the upper shell face 212 at the first top edge 511, and the second concave surface 520 intersects with the upper shell face 212 at the second top edge 521, the distance between the first top edge 511 and the second top edge 521 is preferably about 12 mm~18 mm, which enables the mobile terminal 900 to insert.

In other embodiments, the first concave surface and the second concave surface may not mutually parallel, but it should be ensured that the space between the first concave surface and the second concave surface is large enough to insert the mobile terminal.

The angle between the upper shell face 212 and the third concave surface 530 and the angle between the upper shell face 212 and the forth concave surface 540 is 30~50 degree, wherein the third concave surface 530 is parallel to the forth concave surface 540. The fifth concave surface 550 is parallel to the upper shell face 212, and the distance between the fifth concave surface 550 and the upper shell surface 212 is equal or longer than 12 mm, and the minimum height of the upper side shell 220 at the fifth concave face 550 is equal to or higher than 4 mm. The third concave surface 530 is further away from the hinge of the cup sleeve 200 and the fixing base 300 than the forth concave surface 540. The third concave surface 530 is gradually far away the fixing base 300 from one end close to the first concave surface 510 to another end close to the fifth concave surface 550.

The distance between the fifth concave surface 550 and the upper shell face 212 is set to make the mobile terminal 900 be available to be inserted into for a certain depth, so as to make it stable. Keeping a certain angle makes the user more easily to see the screen when the mobile terminal 900 is placed in the slot 500. The minimum height of the upper side shell 200 at the fifth concave surface 550 ensures that the upper shell 210 won't deform after the insertion of the mobile terminal 900.

The cup carrier 400 has a lower shell 410 and a lower side shell 420, wherein the lower side shell 420 is fixedly connected to the rim of the lower shell 410. The cup carrier 400 is provided with two opposite depressed portion 430, which are located in the lower side shell 420. The two transmission links 440 are located in the two depressed portion 430, when the rotation angle of the cup carrier 400 relative to the fixing base 300 is 0 degree. And the cup sleeve 200 and cup carrier 400 can be rotated around the fixing base 300 until the mobile terminal 900 is simultaneously placed into the two depressed portions 420 and the two slots 500.

Figure 6:
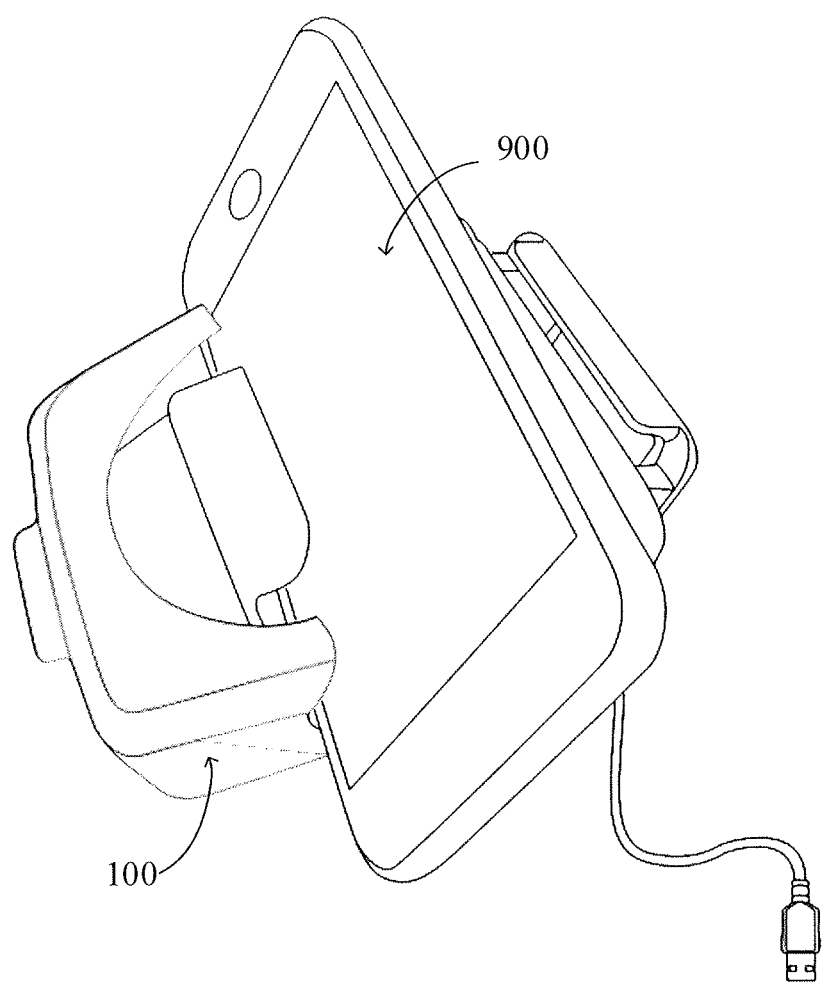
FIG. 6 is a perspective structural view of the charging cup holder with slot placing the mobile terminal under the folded state according to the preferable embodiment.
Figure 7:
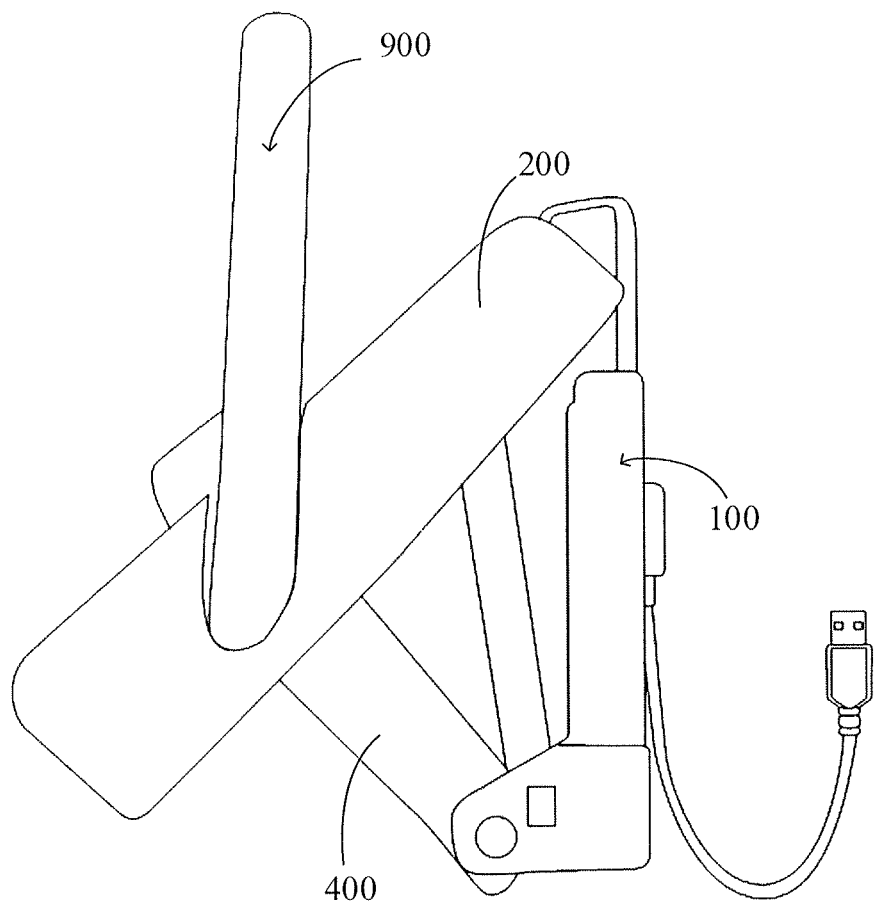
FIG. 7 is a right view of the charging cup holder with slot placing the mobile terminal under the folded state according to the preferable embodiment.

In the embodiment, as shown in FIGS. 6-7, when the rotation angle of the cup carrier 400 and the cup sleeve 200 relative to the fixing base 300 is between 40~50 degree, the mobile terminal 900 is simultaneously placed in the two depressed portions 430 and the two slots 500.

Figure 4:
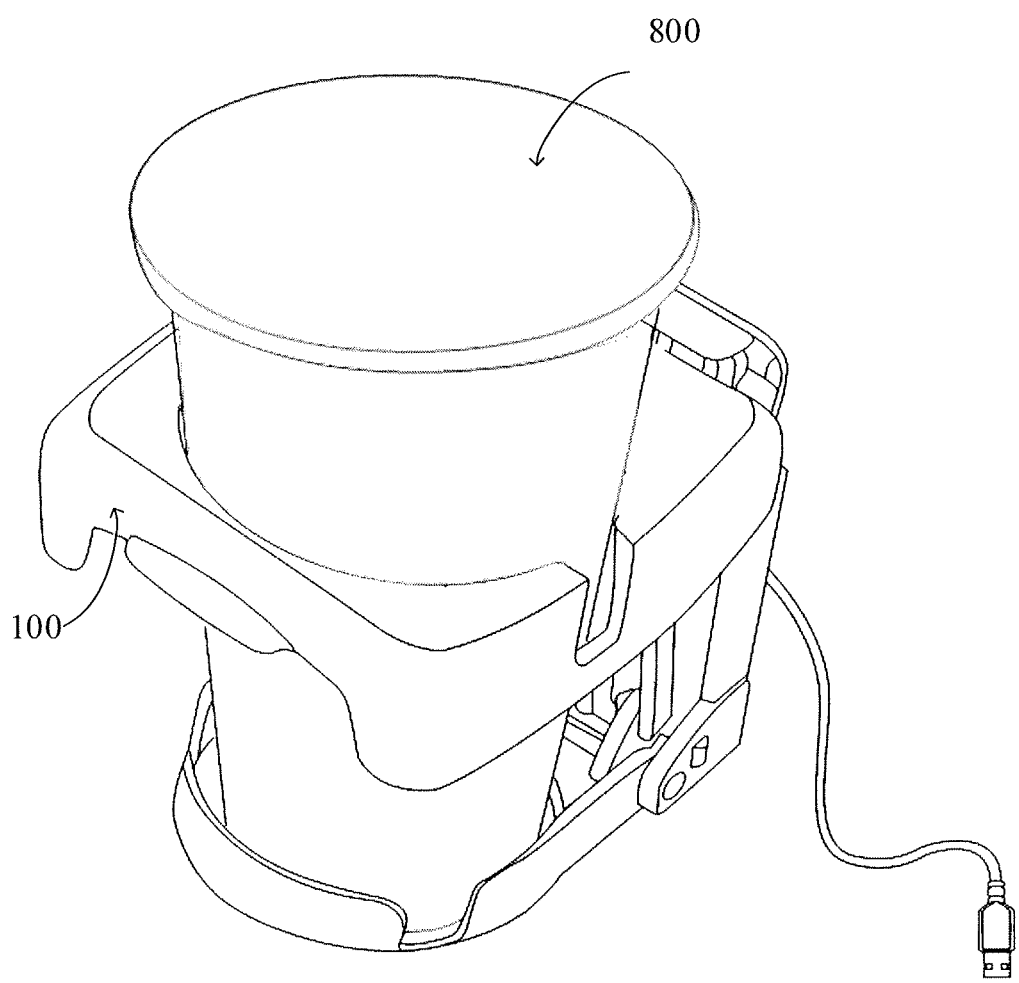
FIG. 4 is a schematic view of the charging cup holder with slot placing the cup according to the preferable embodiment.
Figure 5:
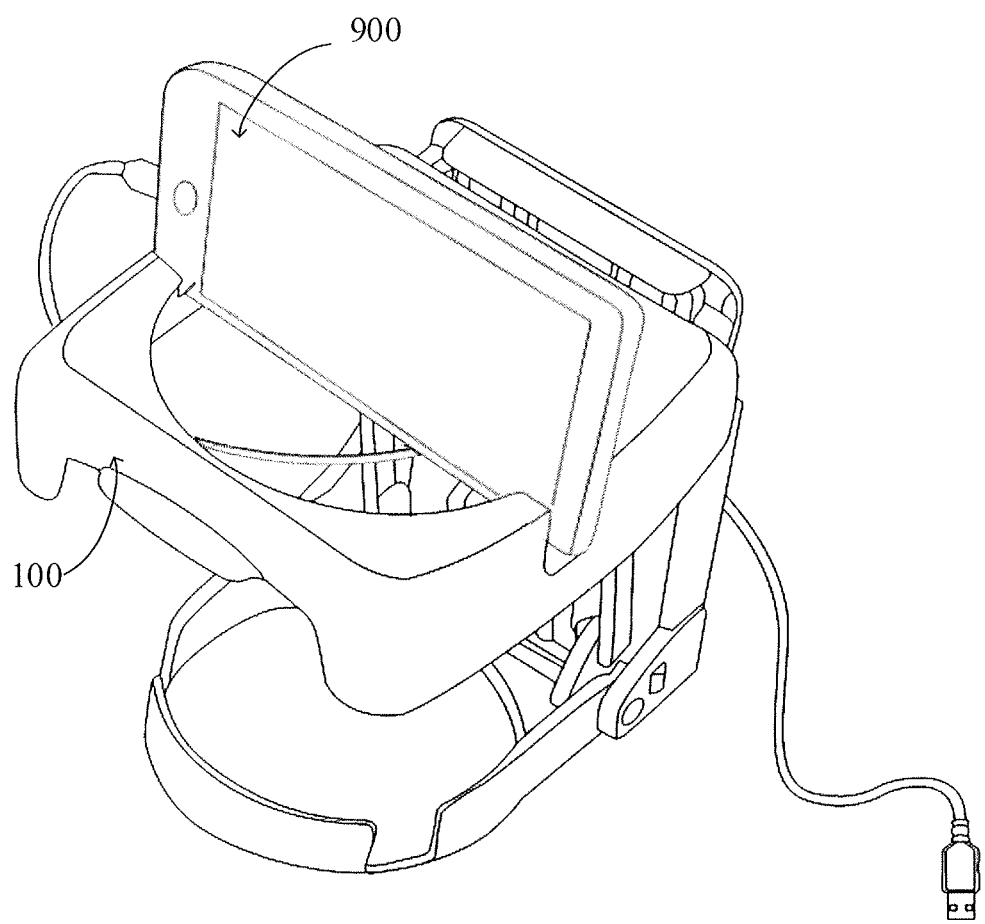
FIG. 5 is a schematic view of the charging cup holder with slot placing the mobile terminal according to the preferable embodiment.

The charging cup holder with slot 100 can be used as an ordinary cup holder to place the cup 800, as shown in FIG. 4. When the charging cup holder with slot 100 is used for charging the mobile terminal 900, the mobile terminal 900 is placed in the slot 500 and electrically connected to the USB interface 310 of the fixing base 300 with USB adapter cable to supply power for the USB interface 310 by a power force fixed to the fixing base 300 or by a mobile power pack alternately.

It should be understood that, in the description of the utility, terms used to reference the orientation or positional relationship are based on the orientation or positional relationship in the drawings, such as "upper", "lower", "front", "rear", "left", "right", "vertical", "horizontal", "bottom", "inner", "outer", etc., and they are only used to facilitate the description of the present invention and simplify the description, but not to indicate or suggest the specific orientation of the arrangement or member or to suggest it must be configured or operated in a specific orientation, and therefore, they should not be deemed as limiting.

Although specific embodiments of the present invention have been described above, but it should be understood by the skilled in the art that those are merely illustrations, and the scope of protection of the present invention is defined by appended claims. It will be apparent to those skilled in the art that variants and modifications can be made in the embodiments without departing from the principles and essential characteristics of the present invention, and these variants and modifications are within the scope of the present invention.

The invention claimed is:

1. A charging cup holder with a slot, comprising a cup sleeve, a fixing base and a cup carrier; the cup sleeve is hinged to an upper end of the fixing base, and the cup carrier is hinged to a lower end of the fixing base, wherein a USB interface that is configured to be electrically connected to a mobile terminal is provided on the fixing base and the cup sleeve is provided with two opposite slots for placing the mobile terminal.

2. The charging cup holder with a slot according to claim 1, wherein the cup sleeve has an upper shell and an upper side shell fixedly connected to a rim of the upper shell, and the slot intersects with both the upper shell and the upper side shell, and each slot has a first concave surface and a second concave surface, which are formed by intersecting with the upper shell, and each slot further has a third concave surface, a fourth surface and a fifth surface, which are formed by intersecting with the upper side shell, and the first concave surface is opposite to the second concave surface, and the third concave surface is opposite to the fourth concave surface, and both ends of the third concave surface are respectively connected to the first concave surface and the fifth concave surface, and both ends of the fifth fourth concave surface are respectively connected to the third concave surface and the fourth concave surface.

3. The charging cup holder with a slot according to claim 2, wherein the first concave surface and the second concave surface of each slot are mutually parallel, and the third concave surface and the fourth concave surface of each slot are mutually parallel.

4. The charging cup holder with slot according to claim 3, wherein the upper shell is provided with a circular through hole used for the cup passing through, and the circular through hole is formed around an axis, and the first concave surface and the second concave surface has a symmetrical face which intersects with the axis.

5. The charging cup holder with a slot according to claim 3, wherein the upper shell has an upper shell face, and the first concave surface of each slot intersects with the upper shell face at a first top edge, and the second concave surface intersects with the upper shell at the second top edge, and the distance between the first top edge and the second top edge is 12 mm-18 mm.

6. The charging cup holder with a slot according to claim 5, wherein an angle between the upper shell face and the third concave surface and an angle between the upper shell face and the fourth concave surface that is parallel to the third concave surface are 30-50 degrees, respectively.

7. The charging cup holder with a slot according to claim 5, wherein the fifth concave surface is parallel to the upper shell face, and a distance between the fifth concave surface and the upper shell surface is equal to or longer than 12 mm, and the minimum height of the upper side shell at the fifth concave surface is equal to or higher than 4 mm.

8. The charging cup holder with a slot according to claim 2, wherein the third concave surface is further away from the hinge of the cup sleeve and the fixing base than the fourth concave surface, and the third concave surface is gradually far away from the fixing base from one end close to the first concave surface to another end close to the fifth concave surface.

9. The charging cup holder with a slot according to claim 1, wherein the cup carrier has a lower shell and a lower side shell fixedly connected to a rim of the lower shell, and the cup carrier is provided with two opposite depressed portions located on the lower side shell, and there are two transmission links provided between the cup carrier and the cup sleeve, and both of the cup sleeve and cup carrier can rotate 0-90 degrees relative to the fixing base, and the two transmission links will be located in the two depressed portions, when the rotation angle of the cup carrier relative to the fixing base is 0 degrees.

10. The charging cup holder with a slot according to claim 9, wherein the cup sleeve and the cup carrier can rotate around the fixing base so that the mobile terminal is simultaneously placed in the two depressed portions and in two slots.

* * * * *